United States Patent

[11] 3,612,895

| [72] | Inventor | Janis M. Niedra<br>Fairview Park, Ohio |
|---|---|---|
| [21] | Appl. No. | 849,106 |
| [22] | Filed | Aug. 11, 1969 |
| [45] | Patented | Oct. 12, 1971 |
| [73] | Assignee | The United States of America as represented by the Administrator of the National Aeronautics and Space Administration |

[54] PULSE COUPLING CIRCUIT
12 Claims, 7 Drawing Figs.

[52] U.S. Cl. .................................................. 307/88 MP,
307/262
[51] Int. Cl. .................................................. H03k 17/80
[50] Field of Search .......................................... 307/88,
262, 269, 293, 314; 328/67

[56] References Cited
UNITED STATES PATENTS
2,830,178  4/1958  White ........................... 250/27

*Primary Examiner*—James W. Moffitt
*Attorneys*—N. T. Musial, G. E. Shook and G. T. McCoy

ABSTRACT: A switch, such as a transistor, is interposed between a pulse generator and a winding of an inductor, a load being coupled to the inductor. The switch isolates the inductor from the pulse generator at the end of each pulse causing a partial cycle L-C oscillation in the inductor to reset its core. A capacitor may be connected across the inductor winding. To dissipate some energy, a resistor may be connected in series with the capacitor. The voltage across the inductor winding may be limited by a diode and a zener diode serially connected across the winding. Critical damping of the L-C oscillation is obtained by connecting the resistor and the capacitor in parallel with the zener diode. Two such circuits may be doubled up in back-to-back relationship to energize two individual loads or one single load.

INVENTOR
JANIS M. NIEDRA

ATTORNEYS

INVENTOR
JANIS M. NIEDRA

BY

ATTORNEYS

INVENTOR
JANIS M. NIEDRA

PULSE COUPLING CIRCUIT

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The invention relates to electronic signal coupling circuits and is directed more particularly to a pulse coupling circuit.

With electronic switching circuits such as those used in inverter and converter circuits there is frequently a need to drive two or more loads, such as transistor switches, from a source of repetitive positive or negative voltage pulses. Generally, the loads must be isolated from one another and from the voltage pulse source with regard to any DC flow. In the prior art, the required DC isolation for such circuit arrangements was obtained by using either a pulse transformer or a differential direct current amplifier for each load. Pulse transformers impose severe limitations in that repetitive pulses, either positive or negative, must be spaced far apart timewise in relation to the width or duration of each of the pulses. Differential direct current amplifiers are not only complex devices but also require a supply of electrical power for operation. Furthermore, it is doubtful that such amplifiers could provide a sufficiently high degree of isolation for high power switching circuits.

OBJECTS AND SUMMARY OF THE INVENTION

It is an object of the invention to provide a pulse coupling circuit which is simple in construction and operation.

It is another object of the invention to provide a coupling circuit which is passive and requires no electrical power outside of that contained in the electrical signal being coupled.

It is still a further object of the invention to provide a coupling circuit which provides a high degree of voltage isolation between a load and a source of voltage pulses and between loads where more than one load is being energized from the voltage pulse source.

It is yet another object of the invention to provide a coupling circuit which can pass repetitive pulses spaced comparatively close together in relationship to their width.

Still another object of the invention is to provide a circuit of the above type which transforms the voltage pulses as well as their average valve to higher or lower levels.

In summary, the invention provides circuitry which couples relatively closely spaced pulses from a pulse source to one or more loads without requiring any external electrical power and with complete DC isolation.

DETAILED DESCRIPTION OF THE INVENTION

Figure 1:
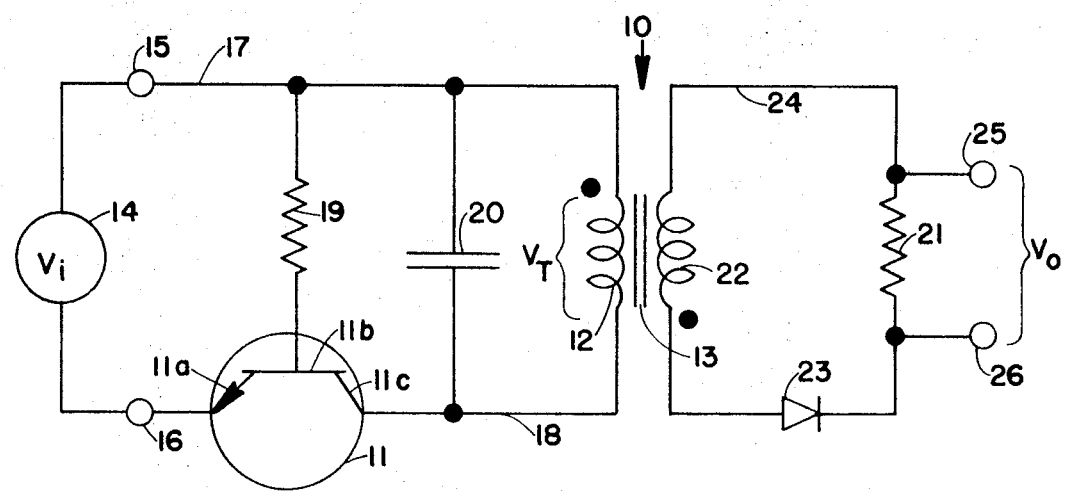
FIG. 1 is a schematic drawing of a basic embodiment of the invention.

Referring now to FIG. 1, it will be seen that circuitry embodying the invention may include a signal coupling device such as an inductor 10 and a switch means such as an NPN-type transistor 11 having an emitter electrode 11a, a base electrode 11b and a collector electrode 11c. The inductor 10 is comprised of a winding 12 carried on a magnetic core 13.

The input signal for the circuit of FIG. 1 is derived from a suitable pulse generator 14 which may provide either positive or negative voltage pulses or both to a pair of input terminals 15 and 16 across which it is connected. In order to apply the voltage pulses to the winding 12, one end of the winding is connected to the input terminal 15 by means of a lead 17 while the other end of the winding is connected through a lead 18 to the collector electrode 11c of the transistor 11 whose emitter electrode 11a is connected to the input terminal 16. The transistor 11 serves as a unidirectional current conducting switch and will allow current to flow through lead 17, the winding 12, the lead 18 and its own collector-emitter circuit when the input terminal 15 is positive with respect to the input terminal 16. When the latter condition terminates or the polarity of the voltage reverses, a control means such as a resistor 19 connected between the base electrode 11b of transistor 11 and the lead 17 which is electrically the same as the input terminal 15 reverse biases the transistor 11 causing it to turn off. This turning off of the transistor 11 isolates the winding 12 from the pulse generator 14. As a result, the inductor 10 resonates with the distributed capacitance of the winding 12 for one-half cycle of L–C-type oscillation. This resets the core 13 as will be explained presently.

Depending on the inductance of the inductor 10 and the distributed capacitance of the winding 12, a capacitor 20 may be connected across the winding 12 so that upon turnoff of the transistor 11 the desired one-half cycle of L–C oscillation will occur.

To the end that the voltage pulses appearing on the winding 12 will be applied to a load such as a resistor 21, a second winding 22 is also carried on the core 13 of the inductor 10. The winding 22 serves as means for coupling the load 21 to the winding 12.

One end of the winding 22 is connected to one end of the load 21 through a unidirectional current conducting device such as a diode 23 while the other end of the winding 22 is connected via a lead 24 to the other end of the load 21. In the preferred embodiment of the invention, the winding 22 operatively couples the load 21 to the winding 12 of the inductor 10, and causes the inductor 10 to be a pulse transformer.

The diode 23 allows current to flow through the load 21 when the pulse generator 14 provides a positive voltage pulse, causing input terminal 15 to be positive with respect to input terminal 16. However, diode 23 prevents current flow through the load 21 during the time the L–C oscillation is taking place in the inductor 10 when the transistor 11 shuts off after each positive pulse applied to the input terminals 15 and 16 terminates. A pair of output signal terminals 25 and 26 may be connected to respective opposite ends of the load 21 for purposes of viewing the wave shape across the load 21 with a device such as an oscilloscope.

Figure 2:
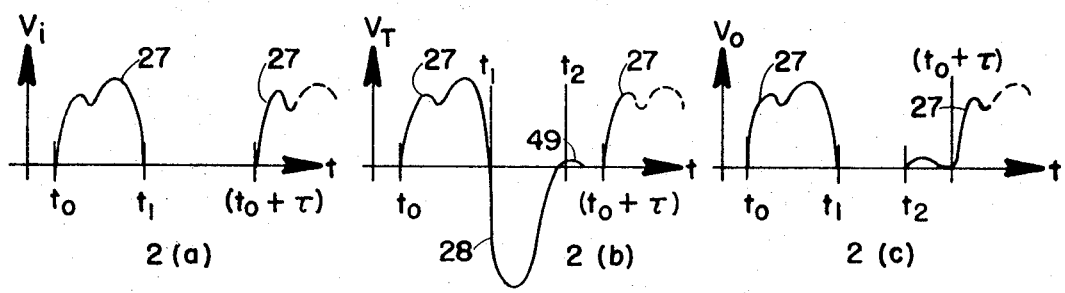
FIG. 2 illustrates the voltage wave shapes at various points in the circuit.

Operation of the foregoing circuit will now be described. Referring to FIG. 2a, the numeral 27 identifies the repetitive positive pulses applied to the terminals 15 and 16 of the coupling circuit shown in FIG. 1 by the pulse generator 14. While only positive pulses 27 are illustrated, the pulse generator 14 may also provide negative pulses. Negative pulses, however, will not produce current flow in the winding 12 because of the unidirectional nature of the transistor 11.

FIG. 2b illustrates the voltage pulses 27 as they appear across the winding 12 of the inductor 10. The voltage which appears across the winding 12 when the transistor 11 turns off at the end of each voltage pulse 27 is indicated at 28. This negative going voltage pulse 28 illustrates the one-half cycle of L–C oscillation that occurs in the inductor 10. It is this partial cycle L–C oscillation that causes the core 13 to reset, as will be described presently with regard to FIG. 3.

FIG. 2c illustrates the voltage wave shapes which appear between the terminals 25 and 26 as taken across the load 21. These voltage pulses are substantially the same shape as the pulses applied to the terminals 15 and 16. Of course, it will be clear to those skilled in the art that the pulse amplitude of the pulses appearing across the load 21 are determined by losses in the circuit as well as by the turns ratio of winding 22 with respect to winding 12.

Figure 3:
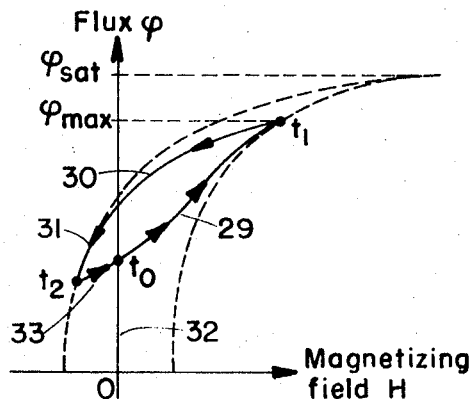
FIG. 3 is a graph of the flux in a transformer core versus magnetizing force.

Referring now to FIG. 3, there is shown a graph of flux in the core 13 versus the magnetizing force impressed on the core 13 by current in the winding 12. For each positive pulse applied to the winding 12, The flux in the core 13 increases along the path indicated by numeral 29 from the beginning of the pulse at $t_0$ to the end of the pulse at $t_1$. During the partial cycle L–C oscillation 28 shown in FIG. 2b, the flux decreases along a path 30 as indicated in FIG. 3. Continuing along the path 30, the flux reverses its direction as indicated by the path 31 which is to the left of the vertical axis 32. Thus it will be seen that the partial L–C oscillation which occurs at the end of each pulse causes the core to reset in that its flux follows the path 30, 31 moving from $t_1$ to $t_2$. A slight positive overshoot 49 which occurs at the end of the L–C oscillation moves the flux of the core 13 along the path 33 from $t_2$ to $t_0$ which was its original starting point. The next positive pulse applied across the winding 12 will cause the core 13 of the inductor 10 to repeat the cycle of operation just described.

Figure 4:
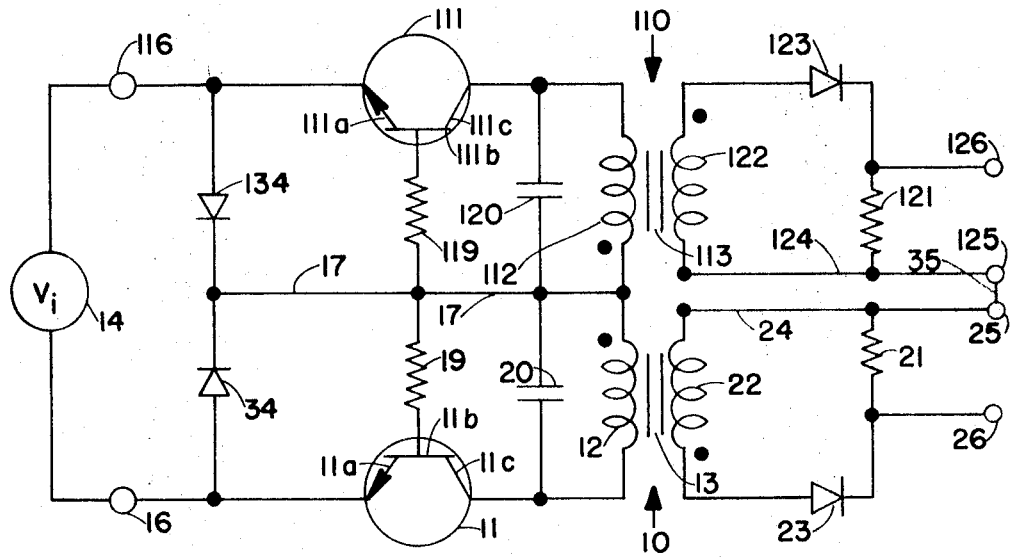
FIG. 4 is a schematic drawing of an alternate embodiment of the invention for supplying pulses to more than one load.

Referring to FIG. 4, there is shown an alternate embodiment of the invention suitable for coupling positive and negative output pulses of the pulse generator 14 to several loads. In general, the circuit shown in FIG. 4 comprises two of the circuits of FIG. 1 connected together in such a manner that positive output pulses of the pulse generator 14 are applied to one load while the negative output pulses are applied to a second load.

The lower half of the schematic of FIG. 4 is similar to the schematic of FIG. 1 and like parts are identified by like numerals. The upper half of the schematic of FIG. 4 is a mirror image of the lower half and parts corresponding to those in the lower half are identified by like numerals prefixed by a numeral 1. In order that current can flow through the winding 12 when an input terminal 116 is positive with respect to the input terminal 16 and through the winding 112 when the polarity applied between the terminals 116 and 16 is reversed, a pair of unidirectional current conducting devices such as diodes 34 and 134 are connected in series opposing relationship between the emitter electrodes 11a and 111a of the transistors 11 and 11, respectively. The lead 17 to which the base electrodes 11b and 111b are connected through a bias resistor 19 and a bias resistor 119, respectively, is connected to a point between the diodes 34 and 134.

As shown in FIG. 4, a lead 35 is connected between an output terminal 25 and an output terminal 125. This results in a voltage between an output terminal 26 and an output terminal 126 which voltage includes both the negative and positive output pulses of the pulse generator 14. If it is desired to have complete isolation between the load 21 and the load 121, the connecting lead 35 may be removed. If this is done, the positive output voltage pulses of the pulse generator 14, that is, those which cause the terminal 116 to be positive with respect to the terminal 16, will appear across the load 21 and the terminal 25 and 26. Similarly, the negative output voltage pulses of the pulse generator 14 will be applied to the load 121 in the terminals 125 and 126. Operation of each half of the circuit of FIG. 4 is substantially the same as for the pulse coupling circuit of FIG. 1.

Figure 5:
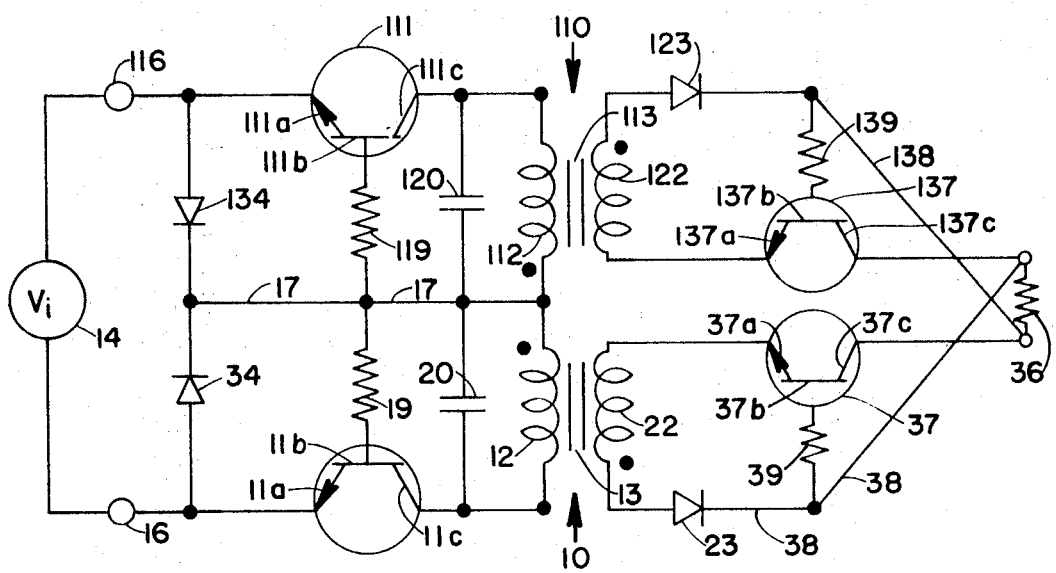
FIG. 5 is a schematic drawing of another embodiment of the invention in which both positive and negative pulses are supplied to a single load.

Referring now to FIG. 5, there is shown another embodiment of the invention which may be used advantageously to supply both positive and negative pulses to a single load 36. The circuit shown in the schematic of FIG. 5 is similar to the circuit of FIG. 4 and corresponding parts are identified by like numerals. To the end that positive voltage pulses will be applied to the load 36, a collector electrode 37c of an NPN type transistor 37 is connected as shown to the lower end of the load 36 while an emitter electrode 37a of the transistor 37 is connected to one end of the winding 22. A diode 23 is connected from the lower end of the winding 22 via a lead 38 to the upper end of the load 36, as shown. A base electrode 37b of the transistor 37 is connected to the lead 38 at a point between the diode 23 and the upper end of the load 36 by means of a bias resistor 39.

When the lower end of the winding 22 is positive with respect to the upper end current will flow to the diode 23, through the lead 38, downwardly through the load 36, and through the collector-emitter path of the transistor 37 to the upper end of the winding 22. Thus, it will be seen that when the transistor 37 conducts, current flow is in a downward direction through the load 36. However, when the polarity of the winding 22 reverses, transistor 37 will not conduct and will prevent any current flow from the winding 22 through the load 36.

In order to produce negative voltage pulses across the load 36 when a pulse from the pulse generator 14 causes the terminal 16 to be positive with respect to the terminal 116, there is provided a circuit which, as shown schematically, is a mirror image of the circuit just described. The components of the mirror image circuit are identified by numerals the same as for parts to which they correspond in the original circuit except for being prefixed by the numeral 1. Operation of the mirror image circuit is the same as for the original except that current flows upwards through the load 36.

Figure 6:
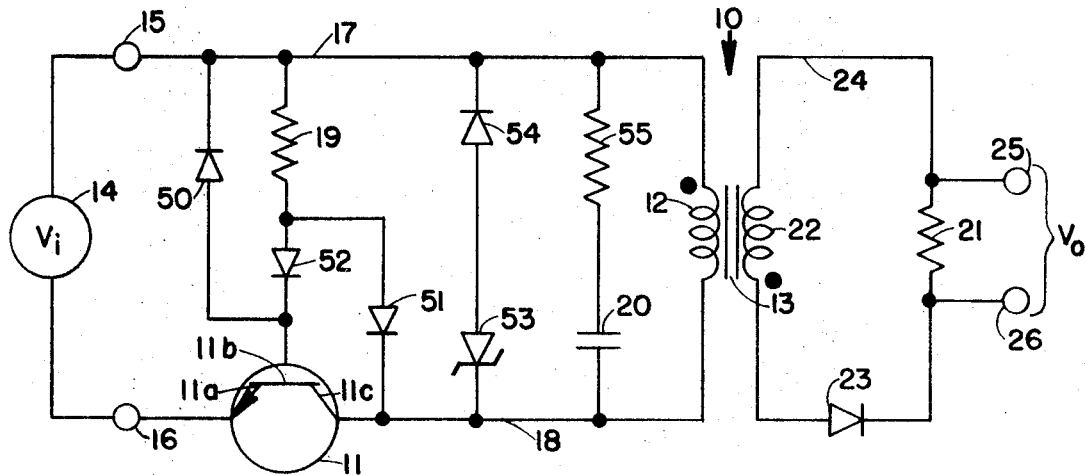
FIG. 6 is a schematic of an alternate embodiment of the circuit of FIG. 1.

The circuit of FIG. 6 is similar to that of FIG. 1 and like parts are identified by like numerals. FIG. 6 illustrates an embodiment of the invention suitable for use at high frequencies and which helps dissipate some of the energy which appears on the inductor 10 when transistor 11 turns off.

In order to keep the collector electrode 11c out of a saturated condition, a diode 50 is connected between the base electrode 11b and lead 17. A diode 51 is connected from the lead 18 to a point between a diode 52 and the bias resistor 19, the diode 52 being connected between resistor 19 and the base 11b. The diode 50 reduces reverse leakage of the base electrode 11b and reduces the sweep-out time of stored charges. By the use of diodes 50, 51 and 52, the turnoff time of transistor 11 can be reduced to as little as three microseconds for transistors such as type 2N3599 or its equivalent.

During reset of the core 13 of the inductor 10, reverse voltages of relatively high peak value are developed across the winding 12. Such voltages, as indicated at 28 in FIG. 2b, may damage the transistor 11. To limit the voltage across the winding 12 and, therefore, between the leads 17 and 18, a voltage breakdown device such as a zener diode 53 is connected serially with a unidirectional conducting device such as an isolating diode 54 between the leads 17 and 18.

To aid the zener diode 53 and diode 54 in dissipating the energy across the winding 12 when the transistor 11 turns off, a resistor 55 is connected serially with the capacitor 20 across the winding 12. After the L–C oscillation identified as 28 in FIG. 2b, energy is dissipated in resistor 55 when capacitor 20 and the capacitance of the winding 12 are discharging. This reduces the magnitude of the positive voltage swing 49 of FIG. 2b. The circuit of FIG. 6 is well-suited for use with an inductor core 13 having a high remanent flux.

Figure 7:
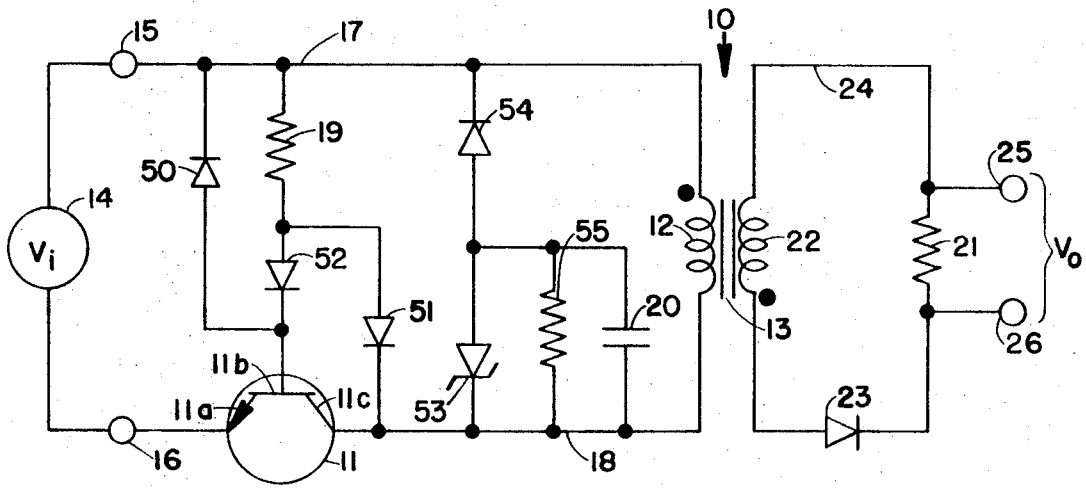
FIG. 7 is an alternate version of the circuit of FIG. 6.

The circuit of FIG. 7 is like that of FIG. 6 and like parts are identified by like numerals. In FIG. 7, the capacitor 20 and the resistor 55 are connected in parallel across the zener diode 53 rather than between the leads 17 and 18. This arrangement causes critical damping of the L–C oscillation which occurs in the inductor 10 when the transistor 11 turns off. Consequently, the undesirable voltage pulse shown at 49 in FIG. 2b is minimized.

Advantageously, the circuit of FIG. 7 minimizes distortion of the pulses being coupled from the generator 14 to the load 21. The circuit is also well-suited for use with an inductor 10 having a core 13 of the type having an inherently low remanent flux.

Those skilled in the art will understand that the circuits of FIGS. 6 and 7 can be doubled-up as was the circuit of FIG. 1 to form the circuit arrangements of FIGS. 4 and 5. Also, transistors and diodes having opposite-type materials to those shown in the FIGS. may be used if the polarities are reversed.

It will be understood that changes and modifications may be made to the above-described circuit embodiments without departing from the spirit and scope of the invention, as set forth in the claims appended hereto.

What is claimed is:

1. A pulse coupling circuit adapted to pass voltage pulses from a pulse generator to a load, said circuit comprising:
   an inductor comprising a magnetic core and at least one winding carried on said core;
   unidirectional current conducting switch means connected serially between said winding and said pulse generator;
   control means connected in controlling relationship to said switch means to render same conducting when said voltage pulses are of one polarity and to render same nonconducting when said voltage pulses are of a second polarity to isolate said winding from said pulse generator after each of said voltage pulses of said one polarity;
   circuit means operatively coupling said load to said winding; and
   a unidirectional current conducting device connected between said circuit means and said load and poled to pass current when said voltage pulses are of said one polarity.

2. The pulse coupling circuit of claim 1 and further including a capacitor connected across said winding.

3. The pulse coupling circuit of claim 2 and further including a resistor, said resistor being serially connected with said capacitor across said winding of said inductor.

4. The pulse coupling circuit of claim 1 and further including a voltage breakdown device and a second unidirectional-conducting device serially connected across said winding of said inductor, and a capacitor connected in parallel with said voltage breakdown device.

5. The pulse coupling circuit of claim 4 and further including a resistor connected in parallel with said voltage breakdown device.

6. The pulse coupling circuit of claim 1 wherein said circuit means for coupling said load to said winding comprises a second winding carried on said core of said inductor.

7. The pulse coupling circuit of claim 1 wherein said switch means comprises a transistor having an emitter electrode connected to one side of said pulse generator, a collector electrode connected to one end of said winding of said inductor, and a base electrode, and wherein said control means comprises a bias resistor connected between said base electrode of said transistor and the other end of said winding of said inductor.

8. The pulse coupling circuit of claim 7 and further including means connected to said base electrode of said transistor to prevent said transistor from operating in a saturated condition.

9. The pulse coupling circuit of claim 7 and further including a second resistor and a capacitor, said resistor and said capacitor being serially connected across said winding of said inductor.

10. The pulse coupling circuit of claim 7 and further including a diode and zener diode serially connected across said winding of said inductor, and a capacitor connected in parallel with said zener diode.

11. The pulse coupling circuit of claim 10 and further including a second resistor connected in parallel with said zener diode.

12. The pulse coupling circuit of claim 1 and further including second switch means connected between said coupling circuit means and the side of said load opposite that to which said unidirectional current conducting device is connected, and second control means connected to said second switch means to render same conducting when said voltage pulses are of a first polarity.